United States Patent
Nylen

[15] 3,696,296
[45] Oct. 3, 1972

[54] MECHANISM FOR TESTING ELECTRICAL EQUIPMENT

[72] Inventor: Roland Nylen, Vasteras, Sweden

[73] Assignee: Allmanna Svenska Elektriska Aktiebolaget, Vasteras, Sweden

[22] Filed: Sept. 21, 1970

[21] Appl. No.: 73,801

[30] Foreign Application Priority Data

Oct. 1, 1969 Sweden .................. 13541/69

[52] U.S. Cl. .......................... 324/158 P, 324/73 R
[51] Int. Cl. .................... G01r 31/22, G01r 15/12
[58] Field of Search..324/158 P, 158 F, 158 R, 73 R, 324/51, 149, 110; 339/174, 176 P, 156

[56] References Cited

UNITED STATES PATENTS

| | | | |
|---|---|---|---|
| 1,211,940 | 1/1917 | Harlow | 339/176 P |
| 1,887,421 | 11/1932 | Newman | 324/73 R |
| 2,793,354 | 5/1957 | Heimbach | 324/158 F |
| 2,877,419 | 3/1959 | East et al. | 324/149 |

FOREIGN PATENTS OR APPLICATIONS 695,292 8/1953 Great Britain ............... 324/23

Primary Examiner—Rudolph V. Rolinec
Assistant Examiner—Ernest F. Karlsen
Attorney—Jennings Bailey, Jr.

[57] ABSTRACT

For testing electrical equipment, a test rig is provided with a number of contact boxes mounted in a frame. Each box contains a normally closed pair of contacts which are connected to apparatus to be tested. A test handle is provided with a number of pins adapted to be connected to testing equipment. The test pins can be inserted through openings in the front of the boxes to enter between the contacts, thus separating them and making a connection to the testing mechanism. An arrangement may also be provided by which the contacts of adjacent boxes can be connected to each other by the opening of the contacts.

13 Claims, 16 Drawing Figures

PATENTED OCT 3 1972

INVENTOR.
ROLAND NYLEN
BY Jennings Bailey Jr

MECHANISM FOR TESTING ELECTRICAL EQUIPMENT

BACKGROUND OF THE INVENTION

1. Field of the Invention

The present invention relates to a means for testing relay protection means and automatic equipment, which permits electrical equipment to be tested without any prior switching having to be done and thus permits rapid and reliable testing of the individual elements in the equipment to be tested.

2. Summary of the Invention

For testing electrical equipment, a test rig is provided with a number of contact boxes mounted in a frame. Each box contains a normally closed pair of contacts which are connected to apparatus to be tested. A test handle is provided with a number of pins adapted to be connected to testing equipment. The test pins can be inserted through openings in the front of the boxes to enter between the contacts, thus separating them and making a connection to the testing mechanism. An arrangement may also be provided by which the contacts of adjacent boxes can be connected to each other by the opening of the contacts.

BRIEF DESCRIPTION OF THE DRAWINGS

The invention will be described with reference to the accompanying drawings where.

DESCRIPTION OF THE PREFERRED EMBODIMENTS

A testing means according to the invention is built up of a very small number of standard components and can easily be adapted to different types of test-objects. A single main type of contact box is used which can be given varying properties by simple switching procedures. A by-passing bar offers one such possibility. A very small number of test-pins provides all the desired functions of the contact set.

Figure 1:
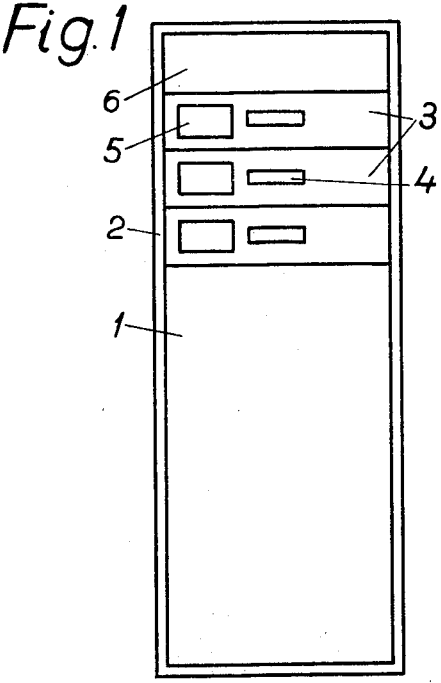
FIG. 1 shows the testing means seen from the front.
Figure 2:
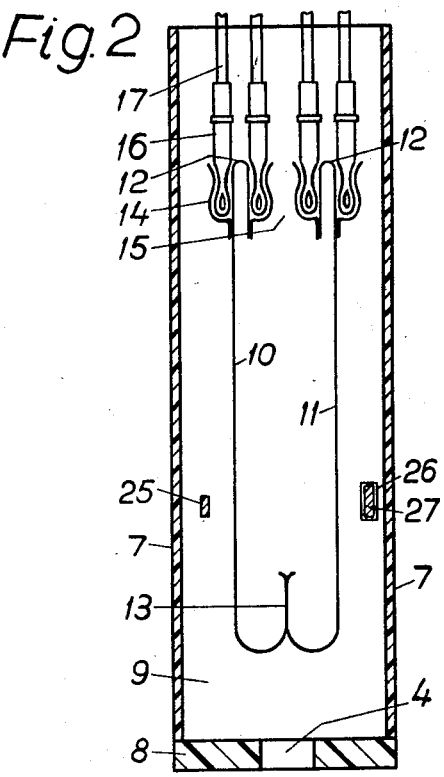
FIG. 2 shows a contact box in horizontal cross-section with the contact set assembled in the box.

The testing device 1 according to FIG. 1 is attached in a manner known per se in a switchboard. The testing device comprises a frame 2 in which a number of contact boxes 3 are inserted in the same way as the drawers in a chest of drawers. At the front of each box is an opening 4 for a test pin which will be described later. Further, these is a sign 5 indicating which circuit of the test-object is connected to the respective contact box. At the top of the testing device is a space 6 where the designation and other information concerning the test-object can be written. Only three contact boxes are shown in the figure. In practice the frame is so large that it can house as many contact boxes as are likely to be needed. If there is a smaller number of contact boxes the other front surfaces of the testing device are covered over by covering plates. A contact box 3 according to FIG. 2 is preferably of insulating material and has side walls 7, front surface 8, bottom 9 and possibly a lid, not shown. The box contains a contact set comprising two spring contacts 10 and 11 which are attached to the box in some known manner at its rear end 12. At the front the springs are bent towards each other so that they have good electrical contact with each other at a contact point 13. At the rear end each spring is provided with two clamps 14 and 15, each of which can take a contact device 16 on the end of a conductor 17, which is inserted at the back of the box. Since there is double connection from the outside to each contact spring, the circuit connected to a certain contact spring 10 or 11 can be further connected, regardless of whether the contact point 13 is open or closed.

The contact box 3 is provided with a support 25 of insulating material attached at the bottom of the box between one side wall 7 and the contact 10. On the opposite side of the contact spring set is a hole 26. The hole 26 is intended to take up a by-passing bar 27 of conducting material. Such a by-passing bar is in the form of a bar extending through two or more contact boxes perpendicular to the contacts 11. The distance between the support 25 and the contact 10 or between the contact 11 and the by-passing bar inserted through the hole 26 is equal. The by-passing bar is used when the contacts 11 in two or more adjacent contact boxes are to be joined. This will be explained in connection with the description of FIGS. 5a, 5b, 8a and 8b, The support 25 causes the pressure on each side of the test pin to be equal.

Figure 3:
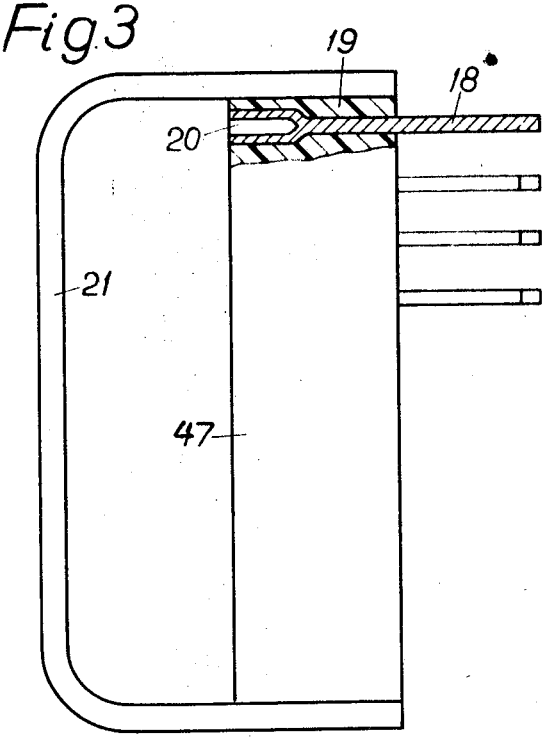
FIG. 3 shows a test-handle from the side, partly in section.

The testing device also includes a test-handle according to FIG. 3. The test-handle comprises a holder 47 for a number of contact pins 18. The holder is preferably made of insulating material with the pins embedded as shown in the sectioned part 19 of the figure. At the rear the pin is provided with connection means for conductors to a test-apparatus, not shown. In the figure the connecting device is shown as a socket 20 for a pin-plug. The holder is provided with a grip-handle 21 for insertion and removal of the test-handle.

Figures 4A, 4B:
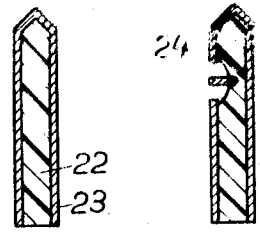
FIGS. 4a, 4b, 4c and 4d shows two different test pins.
Figures 4C, 4D:
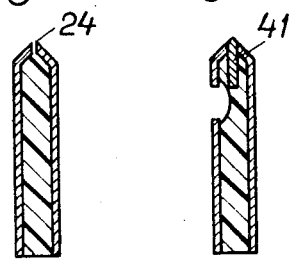

The test-pins 18 which are in the test-handle may have several designs. Depending on their function there are two types; those which, when inserted between the contacts 10 and 11, keep them insulated from each other, and those which maintain electric contact between the contacts. The test-pins consist of a central part 22 of insulating material and an outer, edge layer 23 of conducting material, as shown in FIG. 4a. FIG. 4b shows a test-pin for keeping the contacts 10 and 11 insulated from each other and there is therefore a break 24 in the edge layer 23. This break is situated as such a distance from the free end of the test-pin that when the test-pin is inserted in the contact set the righthand contact 11 will be in contact with the by-passing bar 27 before the contact 10 has passed the break. Furthermore, the break must be of such a size that it cannot be bridged by the contact 10. In order to facilitate the passage of the contact 10 over the break a pin is inserted in the insulating material, this pin being so arranged that its free end surface is on a level with the two parts of the edge layer. The central insulating material is suitably removed along a small area inside the break part 24. FIG. 4c shows a test pin for use in testing electric circuits. The break 24 in the conducting material is positioned at the top of the pin and is very narrow, less than 1 mm. A pin of this design eliminates the risk of damaging voltages if the secondary winding of the current transformer should be opened. When testing electric circuits the ampere meter is connected to both parts of the conducting layer 23. If a pin according to FIG. 4b is used and if there should be a break in any of the conductors to the ampere meter, the secondary winding of the current transformer is opened. With a contact according to 4c, thus, a sparkover occurs immediately over the narrow break 24 before the voltage has had time to assume a dangerous value and the secondary winding is kept short-circuited over the arc in the break. FIG. 4d shows a test-pin of the same type as in FIG. 4b except that here the pin is provided with a ridge 41. Such a pin can be inserted in a contact box only if the opening 4 has a groove corresponding to the ridge.

Figure 5A:
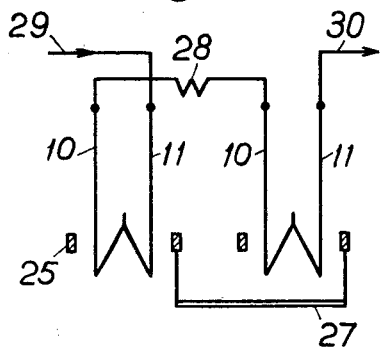
FIGS. 5a and 5b show a current relay being tested.
Figure 5B:
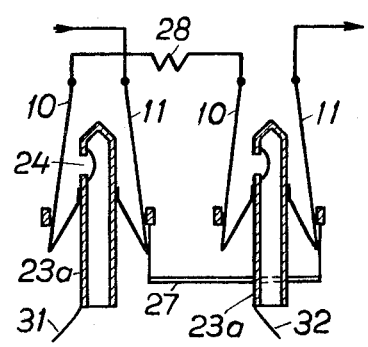

When a current relay is to be tested a by-pass connection is required and this can be obtained in accordance with FIG. 5a. The in-coming conductor 29 is connected over a first contact set to one end of the coil 28 and the other end of the coil is connected over a second contact set to the out-going conductor 30. This arrangement with two cooperating contact sets and a by-passing bar 27 between their contacts 11 makes it possible to test the current relay without breaking the connection between the conductors 29 and 30, which is a desirable condition since several relays are normally fed with current in series. Usually the current flows through the two contact sets according to FIG. 5a. When testing the current relay in question a test pin is inserted in each contact set, as shown in FIG. 5b, so that the current flows through both the contacts 11 and the switching piece 27. One end of the coil 28 is connected through the contact 10 in the lefthand contact set to the conducting part 23a of the lefthand test-pin, to which a conductor 31 is connected. In the same way the other end of the coil 28 is connected to the righthand test-pin, conducting part 23a, and the conductor 32. The relay can now be tested without any subsequent relays being disturbed. The conducting edge layer 23 extends so far down past the point of the test pin that both the contacts 11 are in connection with the switching piece 27 before the lefthand contacts 10 of the contact sets are over the break 24. This arrangement thus gives an uninterrupted by-pass connection of the current past the coil 28 of the current relay.

Figure 6A:
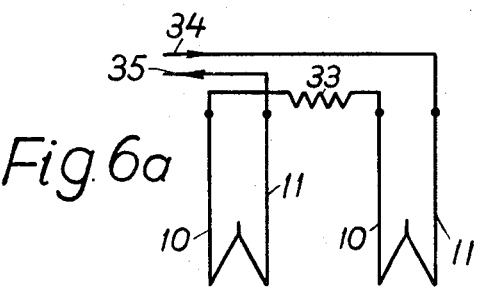
FIGS. 6a and 6b show tests in a voltage circuit.
Figure 6B:
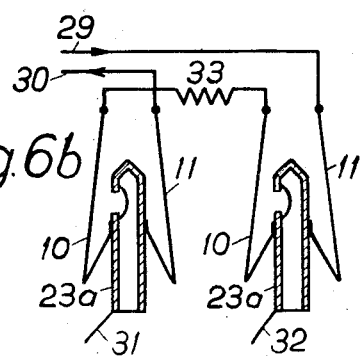

FIGS. 6a and 6b show the conditions for testing a voltage circuit. Here also there are two contact sets in cooperation. When the test pin is inserted in the contact sets, the coil 33 is disconnected from the conductors 34 and 35 and is connected by way of the conducting part 23a of the test-pin to the test conductors 31 and 32.

Figure 7A:
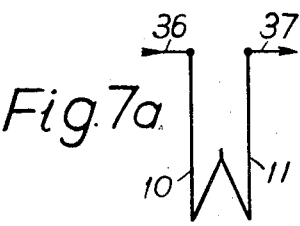
FIGS. 7a, 7b and 7c show tests in a tripping circuit.
Figure 7B:
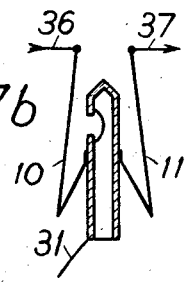
Figure 7C:
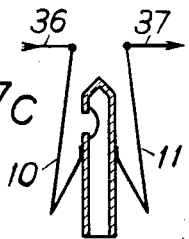

Before testing of a relay protection means is initiated, the tripping relay of the relay means must be blocked so that testing of the separate components in the relay means will not cause a tripping impulse. FIGS. 7a, 7b and 7c show this. The conductors 36, 37 to the tripping relay are normally connected together by a simple contact set 10, 11 as shown in FIG. 7a. The test pin which opens the contact set must therefore accomplish this operation before any other test pin has reached its contact set. This can be done either by making the test pin for the contact set controlling the impulse to the tripping relay somewhat longer than the other test pins or by placing the contact point 13 in FIG. 2 on the contact set slightly nearer the front surface 8. FIG. 7b shows a test pin with connected test-conducting lead 31 in order to measure the tripping time of the protection means. FIG. 7c shows a test-pin used only to break the circuit 26, 27.

Figure 8A:
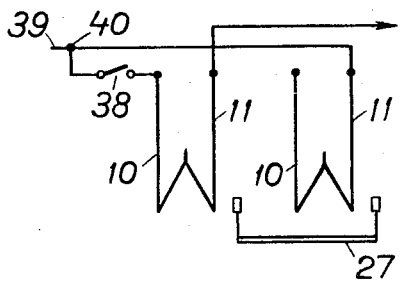
FIGS. 8a and 8b show how the contact sets in two adjacent contact boxes can form a two-way contact.
Figure 8B:
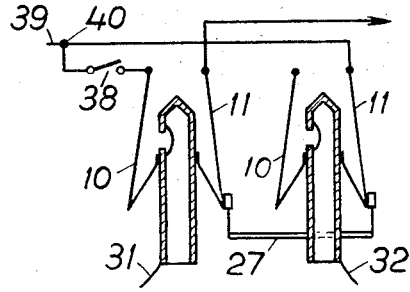

For by-pass connecting blocking means, for example zero-point voltage start of earth current protection means, a two-way contact is required. This can be obtained from two contact sets joined by a by-passing bar. Such a connection is shown in FIGS. 8a and 8b where, as before, FIG. 8a shows the normal position of the connection and FIG. 8b the position when the test-pin is inserted. The blocking contact 38, which may be a considerable distance from the testing place and which is connected to a point 40 in the conductor 39, must be able to be by-pass connected so that other circuits in the conductor can be tested. From FIG. 8a it is clear that such testing can not be carried out as long as the blocking contact 38 is open. When the test-pins are inserted in the two contact sets the contact 38 is bridged by the two contacts 11 and the switching piece 27 so that testing can be carried out.

It is clear from the description and drawings that by variation of the connection of the contact springs 10, 11 to the test-circuits a testing device is obtained having many possibilities. The combination of the contact sets with different types of test-pins increases the field of use for the device even more.

I claim:

1. Means for testing electrical equipment, such as relay protection means and automatic equipment, which comprises a test-rig (1) which is formed of a number of contact boxes (3) in a frame (2), each contact box containing a contact set which is normally closed and is included in the circuit of an element of the electrical equipment, and a test-handle (17,21) comprising a number of test pins corresponding to the number of contact boxes (3), each test pin being connected to a certain element of the means for testing electrical equipment and each test pin being positioned in the test-handle so that when the test-handle is inserted in the test-rig the pins effect a switching of the contact sets and connect the corresponding element in the electrical equipment to its element in the testing equipment, a switching piece (27), at least some of the contact boxes (3) being provided with through holes (26) for the switching piece (27) to be inserted to thereby provide a common conductor for two or more contact boxes situated adjacent to each other and which switching piece (27) is located so that, when a test pin (18) is inserted in the respective box, one of the spring contacts (11) in each contact set abuts the switching piece (27).

2. Means according to claim 1, in which a support (25) is arranged on the side of the contact set opposite the switching piece (27) so that the distance between the contact set and the support (25) is equal to the distance between the contact set and the switching piece.

3. Means according to claim 1, in which, in order to effect a by-pass connection of a current relay (23) when measuring on this relay, the conductor (29) to the relay is connected to the contact (11) in a contact set which can be brought into abutment with the switching piece (27) and the out-going conductor (30) of the relay is connected to a corresponding contact in an adjacent contact set, while the relay is connected over the two other contacts (10) in both the contact sets.

4. Means according to claim 1, in which in order to measure in a voltage circuit, the test-object (33) is connected in series with and between two contact sets.

5. Means according to claim 1, in which in order to by-pass connect an element in a conductor (39), the element is connected in series with a first contact set (10,11) while a point (40) on the conductor situated before said element (38) is connected to the contact (11) in a second contact set which, when the test pin is inserted, comes into contact with the switching piece (27).

6. Means according to claim 1, in which the test-handle comprises a holder (47) for the test pin (18) and a grip-handle 21 arranged on the holder.

7. Means according to claim 1, in which a test pin (18) comprises a central part (22) of insulating material and an outer edge layer (23) of conductive material.

8. Means according to claim 7, in which there is a break (24) in the conducting edge layer.

9. Means according to claim 7, in which the break is situated on the test-pin side.

10. Means according to claim 7, in which the break is situated at the free end of the test pin.

11. Means according to claim 7, in which the test pin is provided with a longitudinal ridge 41 at the free end of the test pin.

12. In a means according to claim 1, a blocking contact in series with one of the members of one of the contact sets which is separated from the other member of the same set when the test pins are inserted, said switching piece being engaged with such other member when the test pins are inserted, whereby to bypass said blocking contact.

13. In a means according to claim 1, a circuit passing through one of said contact sets, a blocking contact in series in said circuit, the insertion of the pins breaking said circuit, the member of the said contact set and the member of the other contact set which abut the switching piece being connected in said circuit in bypass relation to the blocking contact whereby to close the circuit and bypass the blocking contact when the pins are inserted.

* * * * *